United States Patent
Park et al.

(10) Patent No.: US 6,418,100 B1
(45) Date of Patent: Jul. 9, 2002

(54) METHOD FOR FORMATTING, AND MANAGING DEFECTIVE AREA OF, OPTICAL RECORDING MEDIUM

(75) Inventors: Yong Cheol Park; Myong Gu Lee; Jong In Shin; Kyu Hwa Jeong; Sung Dae Kim, all of Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/421,697

(22) Filed: Oct. 20, 1999

(30) Foreign Application Priority Data

Oct. 20, 1998 (KR) .......................... 98/44447
Oct. 20, 1998 (KR) .......................... 98/44448

(51) Int. Cl.$^7$ ............................... G11B 5/09
(52) U.S. Cl. ................... 369/47.14; 369/53.16
(58) Field of Search ............... 369/44.27, 53.2, 369/53.24, 44.32, 47.14, 47.18, 47.22, 47.55, 53.12, 53.15, 53.16, 53.17, 53.32, 53.37, 53.42, 53.45, 124.07, 275.3

(56) References Cited

U.S. PATENT DOCUMENTS 5,404,357 A * 4/1995 Ito et al. .................. 369/44.27
6,049,515 A * 4/2000 Yamamuro ........... 369/53.36 X
6,212,647 B1 * 4/2001 Sims, III et al. ................ 714/8

* cited by examiner

*Primary Examiner*—Paul W. Huber
(74) *Attorney, Agent, or Firm*—Birch, Stewart, Kolasch & Birch, LLP.

(57) ABSTRACT

Method for formatting, and managing a defective area of, a rewritable optical recording medium when a secondary defect list (SDL) is converted into a primary defect list (PDL) without certification by converting only sector numbers of first sectors of the defective blocks listed on the SDL into the PDL. If the defective sector thus listed of the PDL is encountered during writing/reading thereafter, a block (=16 sectors) containing the defective sector is subjected to slipping replacement.

23 Claims, 11 Drawing Sheets

Relatd Art

FIG.8A

| $b_{31}$ | $b_{30}$ $b_{29}$ ..... $b_{24}$ | $b_{23}$ ........ $b_0$ |
|---|---|---|
| entry type | G2F | reserved | Sector number of first sector or defective sector number in defective block |

FIG.8B

| $b_{31}$ | $b_{30}$ $b_{29}$ ..... $b_{24}$ | $b_{23}$ ........ $b_0$ |
|---|---|---|
| 11 | 1 | reserved | Sector number of first sector in defective block |

FIG.8C

| $b_{31}$ | $b_{30}$ $b_{29}$ ..... $b_{24}$ | $b_{23}$ ........ $b_0$ |
|---|---|---|
| 11 | 0 | reserved | defective sector number |

METHOD FOR FORMATTING, AND MANAGING DEFECTIVE AREA OF, OPTICAL RECORDING MEDIUM

BACKGROUND OF THE INVENTION

1. Field of the Invention

The present invention relates to a method for formatting, and managing defective areas of a rewritable optical recording medium.

2. Description of the Related Art

In general, repetitively rewritable optical recording media, i.e., optical disks may be sorted into CD-RW (Rewritable Compact Discs) and rewritable digital versatile discs (DVD-RAM, DVD-RW and DVD+RW). In these rewritable optical disks, information writing/reading thereto/therefrom is performed repetitively according to typical use of the optical disk. The repetitive write/read of information causes a change of a mixing ratio from an initial mixing ratio of a recording layer mixture provided for recording the information, which leads to a loss of initial properties of the mixture. Such loss causes errors in writing/reading information, which is called degradation. Areas of the degradation are turned up as defective areas when formatting, writing or reading of the optical disk is carried out. Other than such degradation, defective areas of the rewritable optical disk are caused by scratches on a surface, dust, and/or production defects. Therefore, in order to prevent writing/reading data to/from the defective areas formed by the foregoing causes, management of the defective areas is required. To do this, as shown in FIG. 1, DMAs (Defect Management Areas) are provided in a lead-in area and in a lead-out area of the optical recording medium (for example, DVD-RAM) for managing the defective areas of the optical recording medium. And, data areas are managed in groups, each having a user area for actual writing of data thereon and a spare area for use in a case of defect occurrence in the user area. In general, there are four DMAs provided in one disk (for example, a DVD-RAM), two in the lead-in area and the other two in the lead-out area. As management of the DMAs is important, the same data is repeatedly written in the four DMAs for protection of data. Each DMA has two blocks having 32 sectors total, i.e., one block has 16 sectors. A first block (called as a DDS/PDL block) of each DMA has a DDS (Disc Definition Structure) and a PDL (Primary Defect List), and a second block (called as an SDL block) of each DMA has an SDL (Secondary Defect List). The PDL denotes a primary defect data storage, and the SDL denotes a secondary defect data storage.

In general, the PDL stores entries of defects which occurred during fabrication of the disk, and all defective sectors identified in formatting, i.e., initializing and re-initializing, the disk. As shown in FIG. 2A, each entry has an entry type and a sector number of a defective sector.

The PDL is further divided into a P-list, a $G_1$-list, and a $G_2$-list. Defective sectors defined by disk fabricators, for example defective sectors from a disk fabricating process, are stored in the P-list. Defective sectors found during a certification process are stored in the $G_1$-list. Defective sectors transferred to the SDL directly without the certification process are stored in the $G_2$-list. The entry type indicates an origin of the defective sector occurrence, for example, if the entry type is '10b', the origin of the defective sector occurrence is sorted to be P-list, and if the entry type is '10b', the origin of the defective sector occurrence is sorted to be $G_1$-list, and if the entry type is '11b', the origin of the defective sector occurrence is sorted to be $G_2$-list.

On the other hand, the SDL, listed in block units, stores entries of defective areas occurring after formatting, or defective areas which cannot be listed on the PDL during formatting. As shown in FIG. 2B, each of the SDL entries has an area for storing a sector number of a first sector of a block having the defective sector therein and an area for storing a sector number of a first sector of a replacement block to replace the defective block. Initialization of the disk includes initialization and re-initialization. During re-initialization, full formatting, such as an initial formatting, occurs including partial certification in which the initialization is done partially, and an SDL is transferred to the $G_2$-list in the PDL. A conversion of the SDL to $G_2$-list (called a simple formatting hereafter), without certification shortens the duration of formatting. The P-list is unchangeable by any formatting. Since the defective blocks on the SDL are stored as in units of sectors (i.e., all sectors in a "defective" block), the $G_2$-list may contain good sectors as well as the defective sectors which cause the block to be "defective."

For example, as shown in FIG. 3A, in the partial formatting, sectors on the P-list and the $G_1$-list before formatting remain on the P-list and the $G_1$-list as they are, and the old $G_2$-list and defective blocks listed on the SDL before formatting go through a certification process. After all entries on the $G_2$-list and SDL are erased, only defective sectors found in the certification process are listed on the $G_1$-list. The defective blocks listed on the $G_2$-list or the SDL may also include sectors without defects. If the $G_1$-list overflows, the rest is listed on a new SDL, and the $G_2$-list has a null data inserted therein.

As shown in FIG. 3B, in the simple or quick formatting in which the SDL is converted into the $G_2$-list without a certification process, sectors on the P-list, $G_1$-list and $G_2$-list before formatting are maintained on the P-list, $G_1$-list and $G_2$-list as they are after formatting. The old SDL entries are converted into 16 PDL entries, and listed on the $G_2$-list after the old SDL entries are erased. In this instance, if the $G_2$-list overflows, the rest of the SDL entries not listed on the $G_2$-list are listed on a new SDL. The overflow occurs because the number of entries which can be listed on the PDL is limited by a DMA processing condition. The following equation (1) shows one example of the DMA processing condition.

$$S_{PDL} + S_{SDL} \leq 16 \text{ sectors } (1 \leq S_{PDL} \leq 15, \text{ and } 1 \leq S_{SDL} \leq 15) \quad (1)$$

$$\text{where, } S_{PDL} = \left\lfloor \frac{(E_{PDL} \times 4 + 4) + 2047}{2048} \right\rfloor, \text{ and}$$

$$S_{SDL} = \left\lfloor \frac{(E_{SDL} \times 8 + 24) + 2047}{2048} \right\rfloor.$$

$S_{PDL}$ is a number of sectors used for maintaining PDL entries; $S_{SDL}$ is a number of sectors used for maintaining SDL entries, $E_{PDL}$ is a number of PDL entries; and $E_{SDL}$ is a number of SDL entries. And, $\lfloor P \rfloor$ for some real number P denotes the greatest integer not greater than P. That is, the equation (1) determines a number of total sectors which can be used both for PDL and SDL, and that number cannot be greater than 16. A number of sectors which can be used either for PDL or SDL cannot be greater than 15.

In the meantime, the defective areas (i.e., defective sectors or defective blocks) in the data area should be replaced with good areas, according to a slipping replacement algorithm or linear replacement algorithm.

Referring to FIG. 4A, in the slipping replacement which is applicable to a case when a defective area is listed on the PDL, if the defective sector is present in the user area on which an actual data is to be written, the defective sector is skipped, and instead, the data is written on a good sector next to the defective sector. Therefore, the user area having the data written thereon is pushed back to occupy as many spare areas as the skipped defective sectors, at the end. That is, the user area slips into the spare area as many as the sectors listed on the PDL.

And, referring to FIG. 4B, in the linear replacement which is applicable to a case when a defective area is listed on the SDL, if a defective block is present in the user area, the defective block is replaced with block units of replacement areas assigned to the spare area in writing the data. If the replacement block listed on the SDL is found to be defective later, a direct pointer method is applied to the SDL. That is, by the direct pointer method, the defective block is replaced with a new replacement block and the SDL entry having the defective replacement block listed thereon is corrected. However, because the linear replacement requires shifting the optical pickup from the user area to the spare area and shifting the optical pickup from the spare area back to the user area, such repetitive shifting may result in a poor system performance.

One of the reasons for reformatting is to improve system performance by transferring the defective sectors listed on the SDL to the PDL, thereby reducing continuous linear replacement. The reformatting may be conducted according to a variety of methods. As the formatting is complicated, there is a trend to simplify the formatting, such as the simple formatting in which the SDL is converted into $G_2$-list without certification. However, the simple formatting in which the SDL is converted into $G_2$-list without certification causes the PDL to approach the DMA processing condition shown in the equation (1) faster because all the sectors of the defective blocks listed on the SDL are converted into $G_2$-list. This is liable to cause overflow from the DMA. For example, as the SDL entry has 8 bytes and the PDL entry has 4 bytes, if one SDL entry is converted into the $G_2$-list of the PDL, the PDL requires 64 (=4×16) bytes. In this instance, if the overflow occurs, a case when the disk cannot be used any more may occur, and the simple formatting impedes making the most use of the DMA.

SUMMARY OF THE INVENTION

Accordingly, the present invention is directed to a method for formatting, and managing defective areas of a rewritable optical recording medium that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for formatting an optical recording medium includes transferring information on defects listed on a secondary defect list (SDL) to a primary defect list (PDL); and listing only information on first sectors of defective blocks from the SDL on the PDL.

Another embodiment of the invention includes a method for formatting an optical recording medium, including transferring information on defects from a secondary defect list (SDL) to a primary defect list (PDL) in either block or sector units based on a predetermined indication; and listing the information in block units or sector units on the PDL based on the indication.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 8A illustrates one example of PDL entry in accordance with a second preferred embodiment of the present invention;

FIG. 8B illustrates one example of PDL entry in accordance with a second preferred embodiment of the present invention, wherein implication of a defective sector number is shown when the entry type is $G_2$-list and G2F flat is unity;

FIG. 8C illustrates one example of PDL entry in accordance with a second preferred embodiment of the present invention, wherein implication of a defective sector number is shown when the entry type is $G_2$-list and G2F flat is zero;

DETAILED DESCRIPTION OF THE INVENTION

Reference will now be made in detail to the preferred embodiments of the present invention, examples of which are illustrated in the accompanying drawings. The present invention improves the simple formatting in which an SDL is converted into the $G_2$-list of a PDL without certification, wherein the defective blocks listed on the SDL in the simple formatting are converted into the PDL. A method for managing defective areas for the foregoing will be explained by way of a first and a second embodiment.

Figure 5:
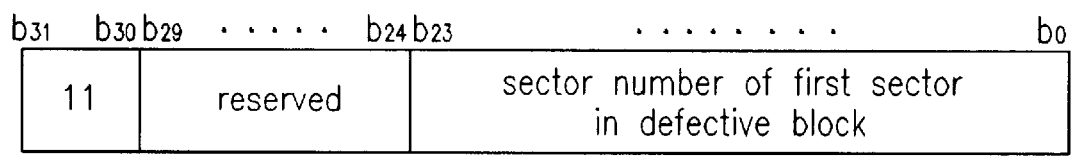
FIG. 5 illustrates one example of PDL entry in accordance with a first preferred embodiment of the present invention.

In the first embodiment, as shown in FIG. 5, only a number of a first sector of a defective block listed on the SDL is listed on the $G_2$-list of the PDL in the simple formatting. If the defective sector listed on the $G_2$-list of the PDL is encountered during data writing/reading, the block containing the defective sector is slip replaced. In the second embodiment, as shown in FIGS. 8A~8C, it is selected in the simple formatting whether only the sector number of the first sector of the defective block listed on the SDL is listed on the PDL, or all the 16 sectors of the defective block listed on the SDL are listed on the PDL. The selection is indicated on a PDL entry, and the block containing the defective sector listed on the PDL is slip replaced according to the indication on the PDL entry during data writing/reading. For example, though the related art requires 64(=4×16) bytes of PDL for conversion of one SDL entry into $G_2$-list of the PDL, the present invention only requires 4 bytes. Only one PDL entry is required if the number of the first sector of the defective block listed on the SDL is listed on the $G_2$-list of the PDL and the remaining 15 sectors are not listed, which reduces a probability of overflow occurrence.

Figure 6:
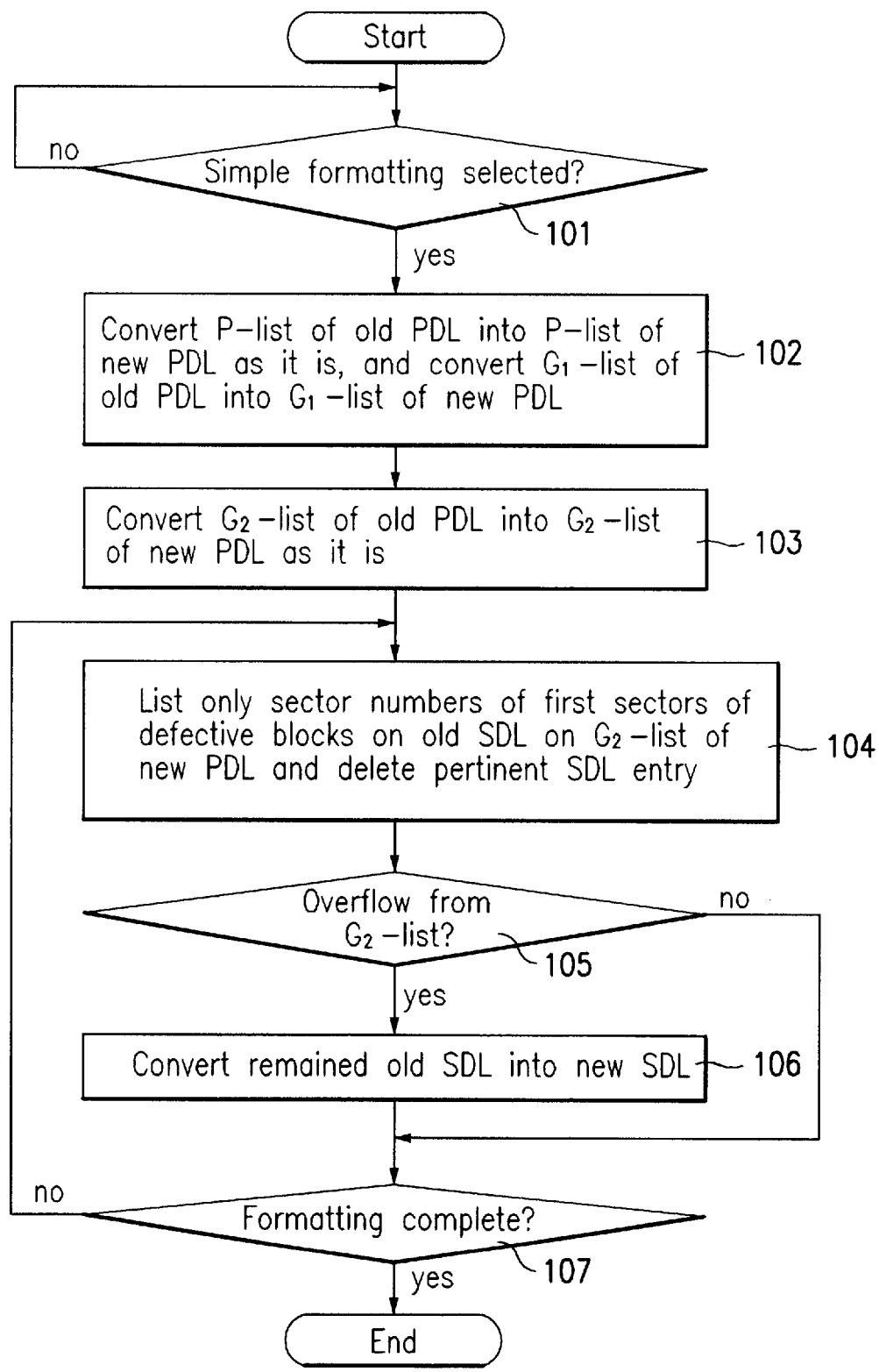
FIG. 6 illustrates a flow chart showing the steps of a method for formatting an optical recording medium in accordance with a first preferred embodiment of the present invention.

FIG. 6 illustrates a flow chart showing the steps of a method for formatting an optical recording medium in accordance with a first embodiment of the present invention.

Referring to FIG. 6, the method begins by selecting a simple formatting in a reformatting (step 101), and, after reading old DMA information, listing defective sectors listed on a P-list of an old PDL on a P-list of a new PDL as they are and listing defective sectors listed on a $G_1$-list of the old PDL on a $G_1$-list of a new PDL as they are (step 102). Next, the defective sectors listed on the $G_2$-list of the old PDL are also listed on the $G_2$-list of the new PDL as they are (step 103). Sectors of the defective blocks listed on the old SDL should be converted into the $G_2$-list of the new PDL, when, as shown in FIG. 5, only numbers of first sectors of the defective blocks listed on the old SDL are listed on the $G_2$-list of the new PDL and the old SDL is erased (step 104). That is, the defective sectors listed on the $G_2$-list of the new PDL in the step 103 are also the numbers of first sectors of the defective blocks. If an overflow occurs from the $G_2$-list of the new PDL under a condition shown by equation (1) (step 105), the remaining old SDL entries are listed on a new SDL as they are, thereby completing the formatting (step 106). If no overflow occurs, steps 104 to 106 are repeated until the simple formatting in which the SDL is converted into the $G_2$-list of the PDL is completed (step 107).

Figure 7:
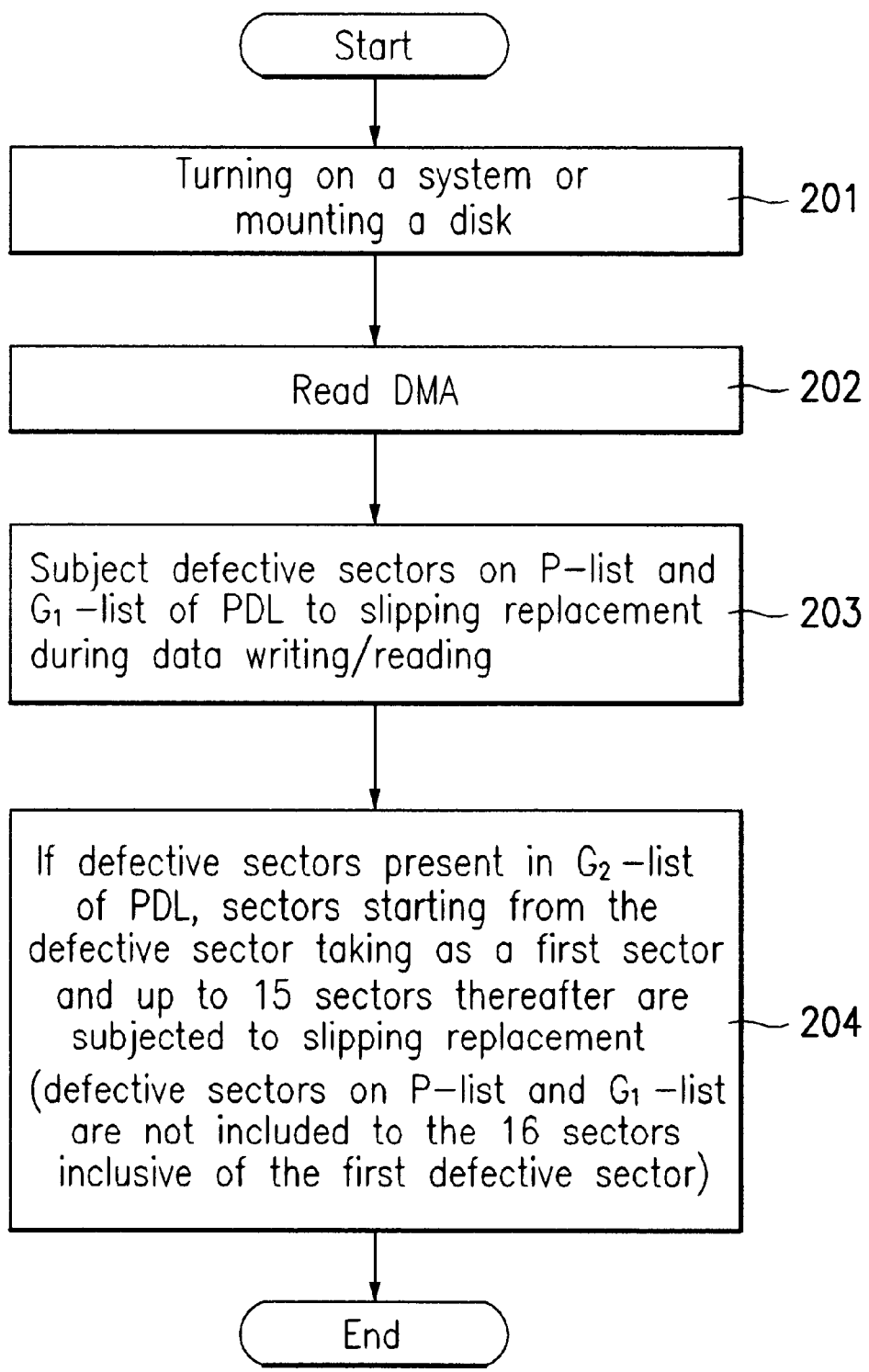
FIG. 7 illustrates a flow chart showing the steps of a method for managing a defective area of an optical recording medium in accordance with a first preferred embodiment of the present invention.

FIG. 7 illustrates a flow chart showing the steps of a method for managing a defective area of an optical recording medium in accordance with the first embodiment of the present invention.

Referring to FIG. 7, the method starts from either turning on of a system or mounting an optical disk on the system (step 201), and reading information on defective sectors listed on a PDL from a DMA and defective sector listed on an SDL according to an initialization process (step 202). And, since the defective blocks listed on the DMA can be known, data is written or read by using slipping replacement when the defective sector listed on P-list or $G_1$-list of the PDL is encountered during the data writing/reading (step 203). That is, if the defective sector listed on the P-list or the $G_1$-list is encountered during data writing, the defective sector is skipped, and, instead, the data is written on a good sector next to the defective sector. In this instance, the defective sector is given no LSN (Logical Sector Number), so that no data is read from the defective sector even in reading.

Figure 1:
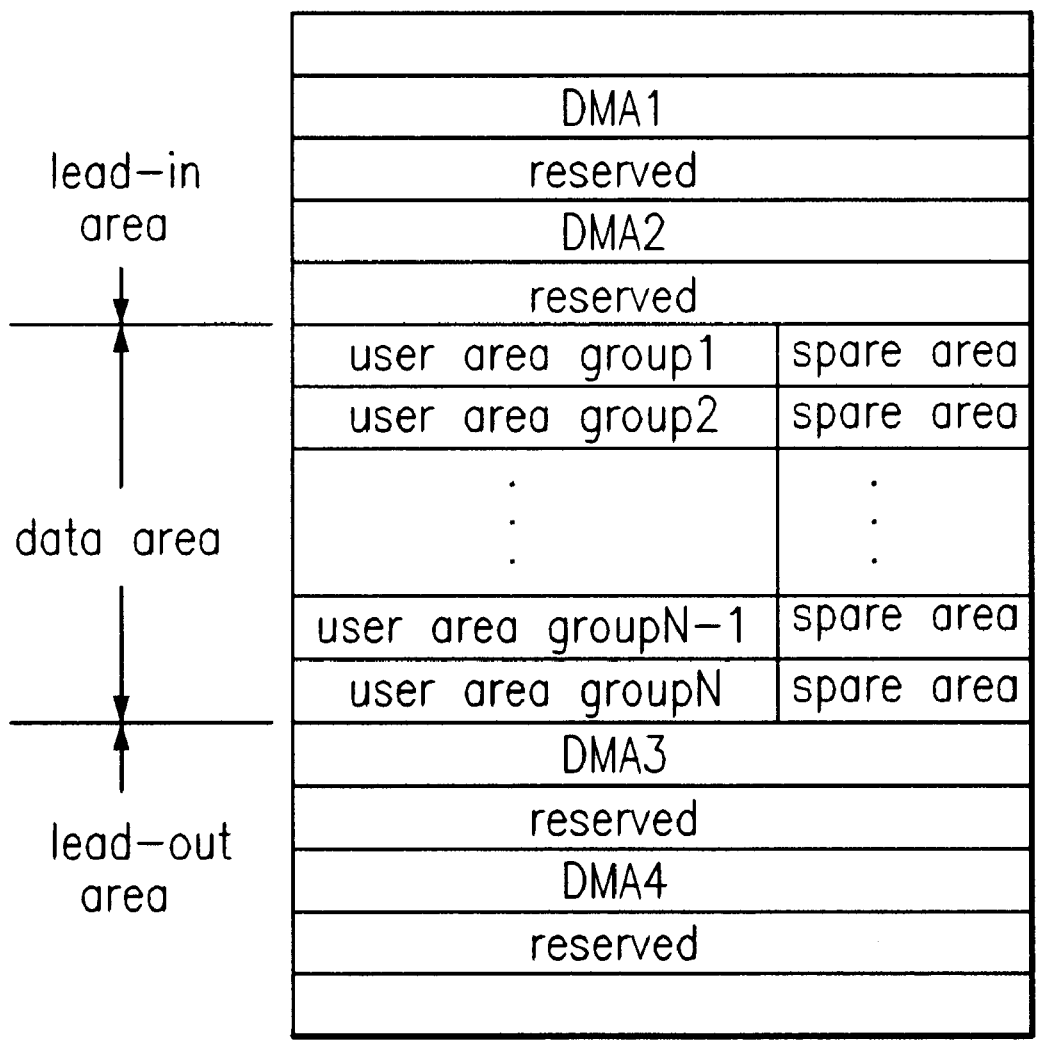
FIG. 1 illustrates a related art architecture of an optical disk.
Figure 2A:
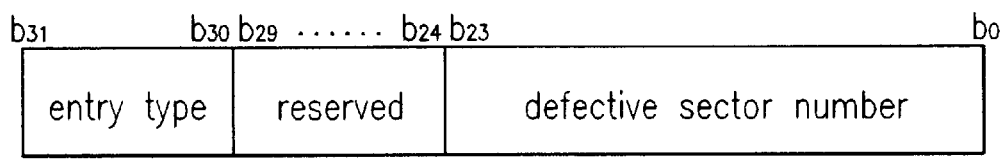
FIG. 2A illustrates a related art PDL entry architecture of an optical disk.
Figure 2B:
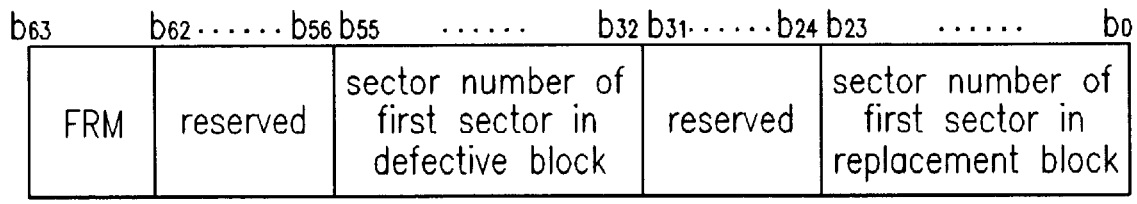
FIG. 2B illustrates a related art SDL entry architecture of an optical disk.
Figure 3A:
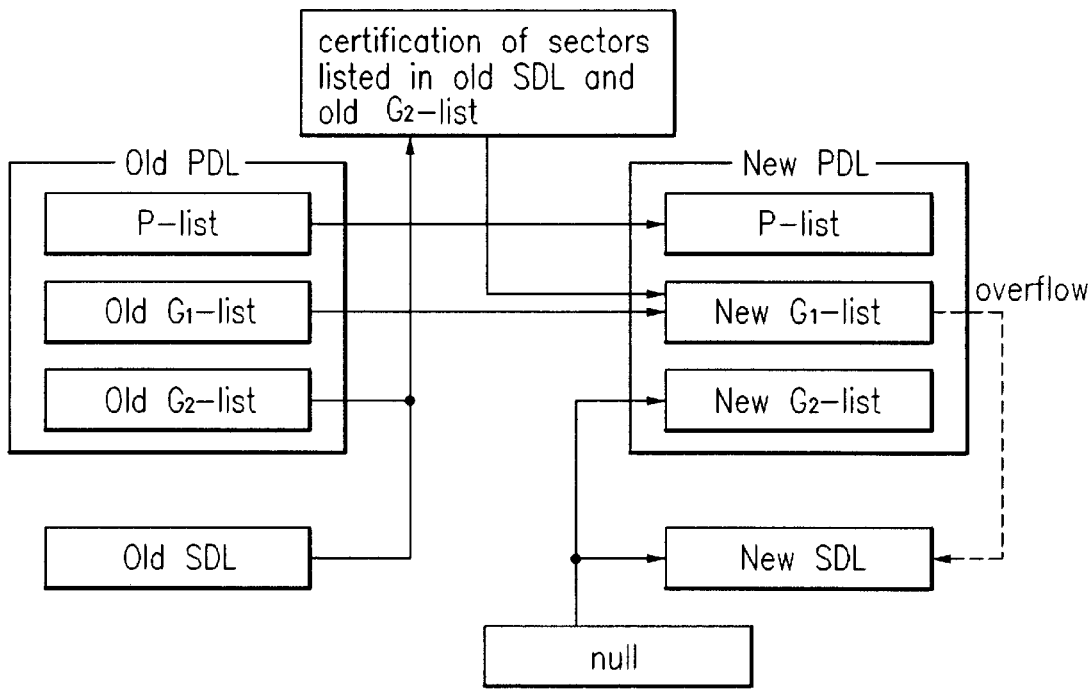
FIG. 3A illustrates a partial formatting in a related art formatting.
Figure 3B:
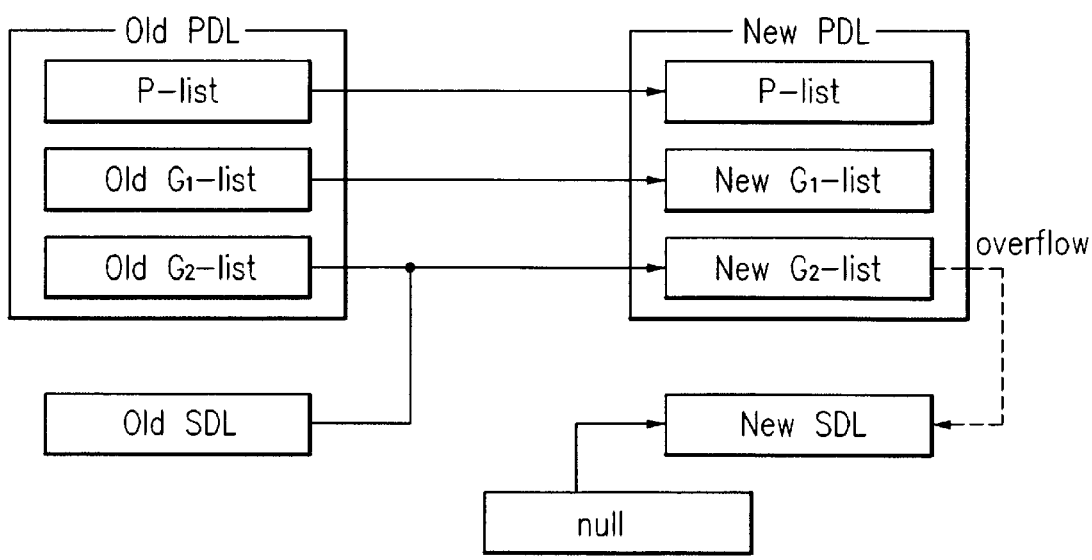
FIG. 3B illustrates a simple formatting in a related art formatting, in which an SDL is converted into G2-list without certification.
Figure 4A:
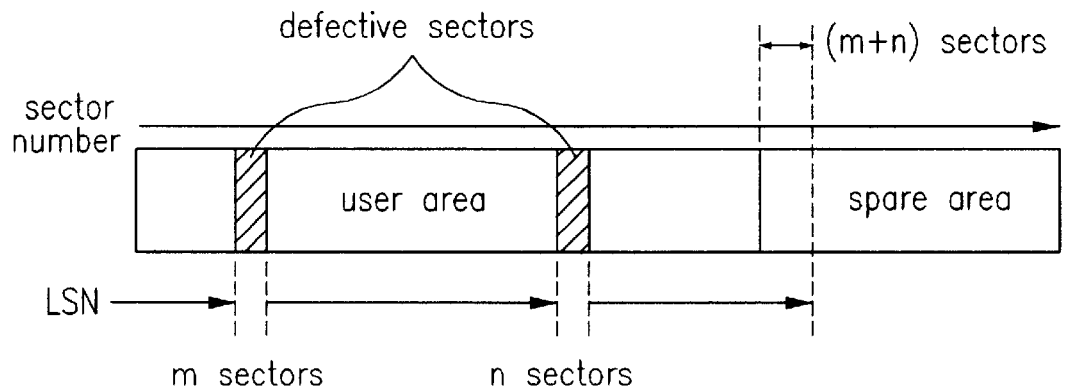
FIG. 4A illustrates a related art slipping replacement.
Figure 4B:
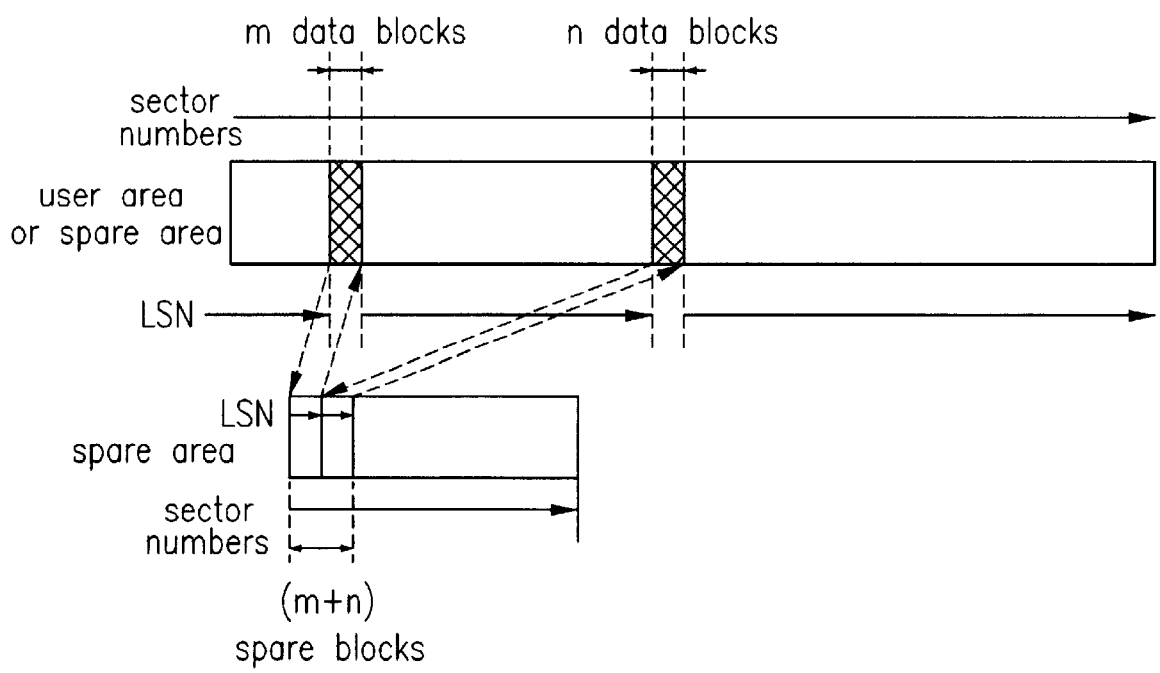
FIG. 4B illustrates a related art linear replacement.

In the meantime, if a defective sector listed on the $G_2$-list of the PDL is encountered during data writing/reading, the defective sector is slip replaced starting from the defective sector taken as a first sector and to 15 sectors thereafter, i.e., all sectors in one block including the defective sector (step 204). For example, if the defective sector listed on the $G_2$-list is encountered during data writing, one block containing the defective sector and 15 sectors thereafter is skipped, and the data is written on a good sector next thereto. In this instance too, the slipping replaced 16 sectors (=one block) are given no LSN. The defective sectors listed on the P-list or the $G_1$-list are not included in the slip replaced 16 sectors (=one block). If the defective sectors listed on the P-list or the $G_1$-list are present in the 16 sectors inclusive of the defective sector listed on the $G_2$-list, an area being slip replaced will be correspondingly larger. For example, if two defective sectors listed on the P-list or the $G_1$-list are present in the 16 sectors inclusive of the defective sector listed on the $G_2$-list, a slip replacement is made up to 18 sectors inclusive of the defective sectors listed on the $G_2$-list. That is, the user area on which a data is written is slipped back to occupy the spare area as many as the skipped 18 sectors. In the meantime, as shown in FIG. 4B, if the defective block listed on the SDL is encountered during writing/reading, the defective block is linear replaced. If the block contains realtime data, other methods may be employed. Thus, the first embodiment of the present invention permits a more effective management of a DMA list by changing the definition of the $G_2$-list.

The second embodiment of the present invention suggests conversion of all the defective sectors listed on an SDL into a PDL, or of only first sectors of the defective blocks listed on the SDL into the PDL, in a simple formatting when defective information listed on the SDL is converted into the PDL without certification. A reserved area of the PDL entry is used to identify such a difference. For example, one bit (as shown in FIG. 8A, called a G2F flag in the present invention) among the reserved area of the PDL entry is allocated. The G2F flag is set to '1' or '0', for knowing whether the defective sector listed on the PDL indicates the first sector of the defective block or just a defective sector.

Referring to FIG. 8A, when the G2F flag is assigned to the PDL entry, it may represents that only a sector number of a first sector of the defective block listed on the SDL is listed on the $G_2$-list. This would leave the next 15 sectors thereafter not listed. If the PDL entry type is the $G_2$-list (i.e., type "11") and the G2F flag is set at '1' as shown in FIG. 8B, then only the sector number of the first sector of the defective block listed on the SDL is listed on the $G_2$-list. And, as shown in FIG. 8C, if the G2F flag is reset at '0', it represents that all sectors of the defective block listed on the SDL are listed on the $G_2$-list respectively. The defective sector number in this case represents one of the sectors. Therefore, if the G2F flag is set at '1', only one PDL entry is required for converting one SDL entry to the PDL.

Figure 9:
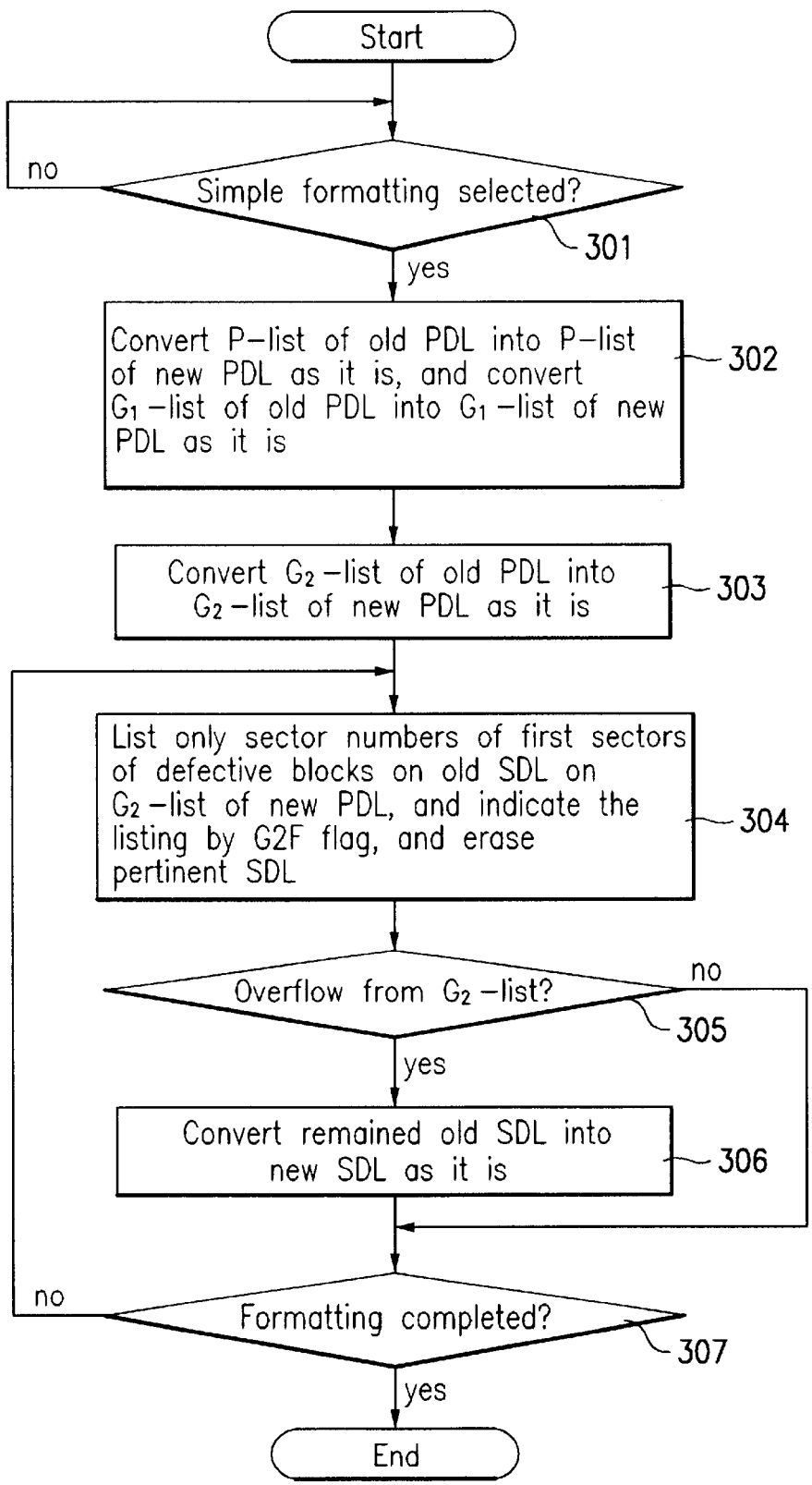
FIG. 9 illustrates a flow chart showing the steps of a method for formatting an optical recording medium in accordance with a second preferred embodiment of the present invention.

FIG. 9 illustrates a flow chart showing the steps of a method for formatting an optical recording medium in accordance with the second embodiment of the present invention.

Referring to FIG. 9, the method starts from selecting a simple formatting in reformatting (step 301), and, after old DMA information is read, the defective sectors listed on the P-list of the old PDL are listed on a P-list of a new PDL as they are. The defective sectors listed on the $G_1$-list of the old PDL are also listed on the $G_1$-list of the new PDL as they are (step 302). The defective sectors listed on the $G_2$-list of the old PDL next are listed on the $G_2$-list of the new PDL as they are (step 303). Sectors of the defective blocks listed on the old SDL should be converted into the $G_2$-list of the new PDL, either for all sectors of the defective blocks or only first sectors of the defective blocks depending on the system's or user's selection.

In the case when all sectors of the defective blocks listed on the SDL are to be listed on the $G_2$-list of the new PDL, the listing can be made by setting the G2F flag to '0' (step 304). In this instance, 16 PDL entries are required for one SDL entry, and are processed the same as the related art. In the meantime, if only the first sectors of the defective blocks listed on the SDL are to be converted into the PDL, only sector numbers of the first sectors of the defective blocks listed on the old SDL are listed on the $G_2$-list of the new PDL, leaving 15 sectors not listed. In this case, the G2F flag is set at '1', and the SDL entries are erased (step 304). In this instance, one PDL entry is required for one SDL entry. If the $G_2$-list of the new PDL overflows by the condition expressed in the equation (1) (step 305), the remaining old SDL entries are listed on new SDL entries as they are (step 306). If the overflow does not occur, the steps 304 to 306 are repeated until the simple formatting in which the SDL is converted into the $G_2$-list of the PDL is completed (step 307).

Figure 10:
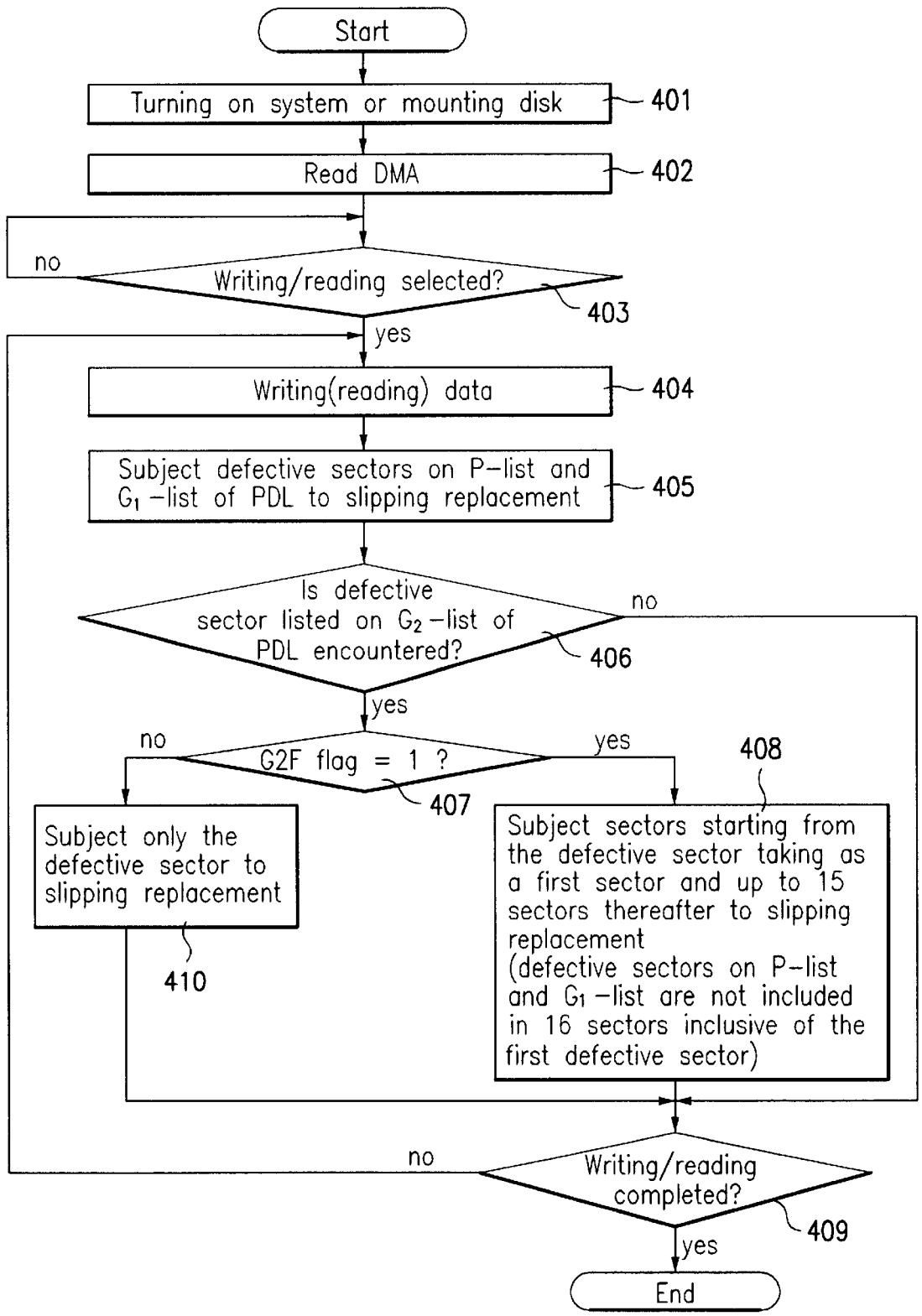
FIG. 10 illustrates a flow chart showing the steps of a method for managing a defective area of an optical recording medium in accordance with a second preferred embodiment of the present invention; and, FIG. 11 illustrates a flow chart showing another example of the steps of a method for managing a defective area of an optical recording medium in accordance with the second embodiment of the present invention.

FIG. 10 illustrates a flow chart showing the steps of a method for managing a defective area of an optical recording medium in accordance with the second embodiment of the present invention.

Referring to FIG. 10, the method starts from turning on a system or mounting an optical disk on the system (step 401). Reading information on defective sectors listed on the PDL and defective sectors listed on the SDL from a DMA under an initialization process (step 402), permits knowledge of whether a sector encountered during data writing/reading is a defective sector listed on the DMA or a good sector. If a defective sector is encountered, the defective sector is listed on the PDL or the SDL. Therefore, if the user selects writing/reading (step 403), data is written to/read from an optical disk (step 404). In this instance, if the defective sector listed on the P-list or the $G_1$-list is encountered, the data is written/read by the slip replacement (step 405). That is, if the defective sector listed on the P-list or the $G_1$-list is encountered during data writing, the defective sector is skipped, and, instead, the data is written on a good sector next to the defective sector. In this instance, no LSN is given to the defective sector, so that no data is read from the defective sector even in reading.

In the meantime, if the defective sector listed on the $G_2$-list of the PDL is encountered during data writing (step 406), G2F flag is checked (step 407). As shown in FIG. 8B, if the G2F is set at '1', which is a case when only first sectors of the defective blocks listed on the SDL are listed on the $G_2$-list of the PDL, sectors starting from the defective sector taking the defective sector as a first sector and up to 15 sectors thereafter (i.e., all sectors in one block including the defective sector) are subjected to slipping replacement (step 408). In this instance too, no LSN is given to the replaced 16 sectors (=one block). The defective sectors listed on the P-list or the $G_1$-list are not included in the slip replaced 16 sectors (=one block). If the defective sectors listed on the P-list or the $G_1$-list are present in the 16 sectors inclusive of the defective sectors listed on the $G_2$-list, an area being slip replaced will be correspondingly larger. For example, if two defective sectors listed on the P-list or the $G_1$-list are present in the 16 sectors inclusive of the defective sector listed on the $G_2$-list, a slip replacement is made up to 18 sectors inclusive of the defective sectors listed on the $G_2$-list. That is, the user area on which a data is written is slipped back to occupy the spare area as many as the skipped 18 sectors. If it is found in step 407 that the G2F flag is reset at '0' as shown in FIG. 8c, which is a case when all sectors of the defective blocks listed on the SDL are listed on the $G_2$-list of the PDL, only the defective sectors are subjected to slipping replacement (step 410). The defective sectors are skipped, and instead, the data is written on good sectors next to the defective sectors. If writing/reading is not completed, the foregoing process is repeated, if writing/reading is completed the program is terminated (step 409).

As another example of the second embodiment of the present invention, elimination of a difference of the $G_1$-list and the $G_2$-list among the entry types of the PDL is suggested. That is, during formatting, defects are listed on the PDL in sector units or block units, and this difference is indicated by setting a flag (a PDL G2 flag in the present invention) at the PDL entry. As an embodiment of the present invention, the PDL G2 flag is set at '1' if the defects are listed in block units on the PDL, and the PDL G2 flag is set as '0' if the defects are listed in sector units on the PDL. And, in a case when only defective sectors are listed on the PDL among defective blocks listed on the SDL through certification, the PDL G2 flag is set at '0'. And, if the PDL G2 flag of an old PDL is reset at '0' in formatting, the old PDL is converted into a new PDL as it is. Therefore, if the PDL G2 flag is '1', it implies that only first sectors of the defective blocks listed on the SDL are listed on the PDL, and the remaining 15 sectors are not listed. And, if the PDL G2 flag is '0', it implies either that all sectors of defective blocks listed on the SDL without certification are respectively listed on the PDL or only defective sectors among defective blocks listed on the SDL are respectively listed on the PDL by certification.

Figure 11:
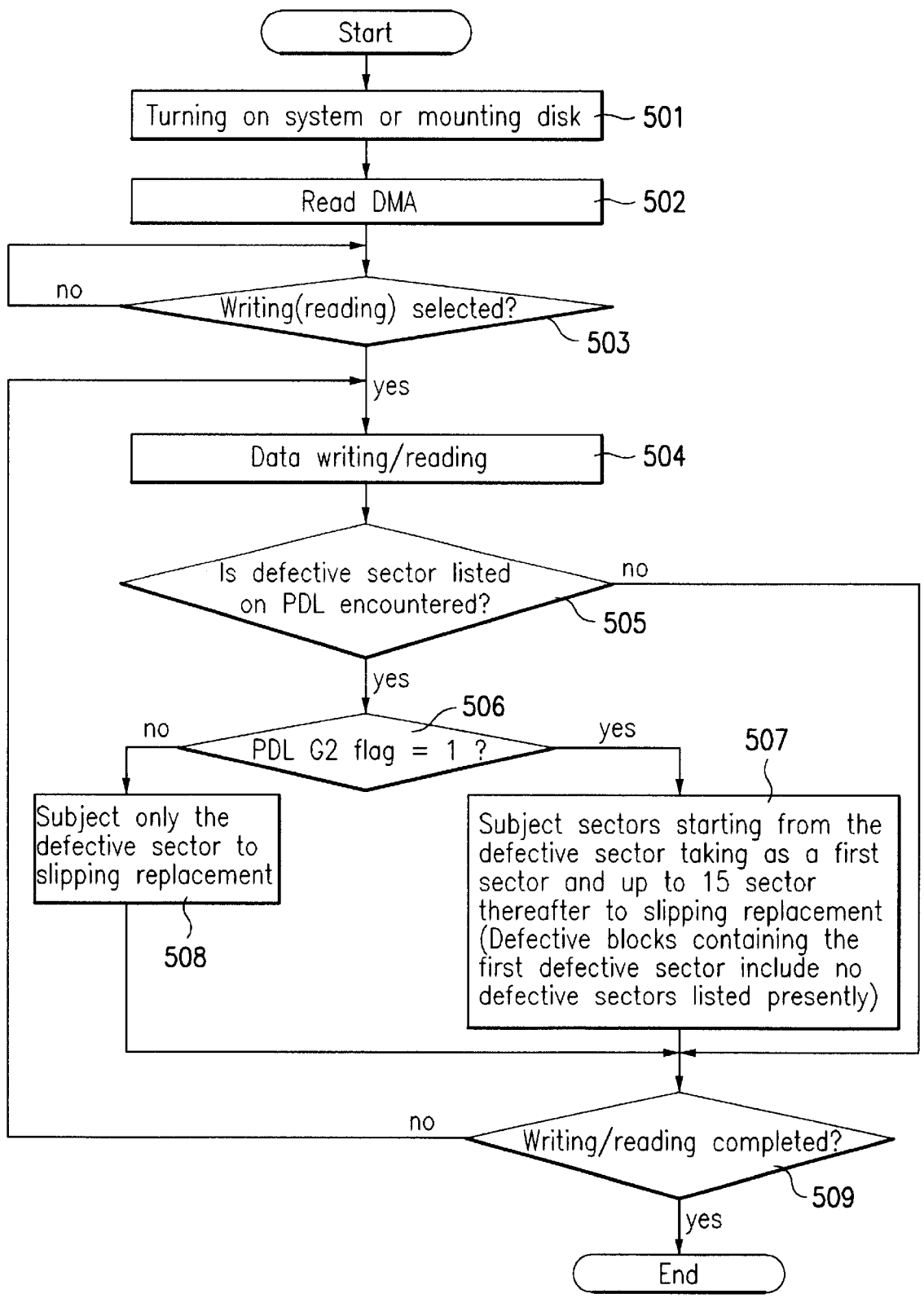

FIG. 11 illustrates a flow chart showing another example of the steps of a method for managing a defective area of an optical recording medium in accordance with the second embodiment of the present invention.

Referring to FIG. 11, the method starts with turning on a system of mounting an optical disk on the system (step 501), and reading information on defective sectors listed on a PDL and an SDL (step 502). If a user selects writing/reading (step 503), data is written to (or read from) on the optical disk (step 504). If the defective sector listed on the PDL is encountered (step 505), the PDL G2 flag at the PDL entry is examined (step 506). If it is determined that the PDL G2 flag is '1', which is a case when only first sectors of the defective blocks listed on the SDL are listed on the PDL, sectors starting from the defective sector taken as the first sector and up to 15 sectors thereafter, (i.e., all sectors in one block inclusive of the defective sector) are subjected to slipping replacement (step 507). For example, if the defective sector is encountered during data writing, a block containing the defective sector is skipped, and, instead, the data is written on a good block next to the defective block. As no LSNs are given to the slipping replaced 16 sectors (=one block), no data is read from a block containing the defective sector in reading, either. In this instance, the existing defective sectors listed in sector units are not included in the slipping replaced 16 sectors (=one block). If it is determined in step 506 that the PDL G2 flag is reset at '0', which is a case when all sectors of the defective blocks listed on the SDL are listed on the PDL, only the defective sectors are subjected to slipping replacement (step 508). That is, the defective sector is skipped, and instead, the data is written on a good sector next to the defective sector. If writing/reading is not completed, the foregoing process is repeated. If reading/writing is completed, the program is terminated (step 509).

As another example of the second embodiment of the present invention, the defective block listed on the SDL is determined to be converted in block units or sector units by using '01' which is not used until now among entry types of the PDL and '11' which denotes the $G_2$-list. That is, if only first sectors of the defective blocks listed on the SDL are converted into the PDL in formatting, the PDL entry type is set at '01', and if all sectors of the defective blocks listed on the SDL are converted into the PDL in formatting, the PDL entry type is set at '11'. Therefore, if the PDL entry type of one defective sector, encountered during data writing/reading, of the defective sectors listed on the PDL is any one of $00b$, $10b$ and $11b$, the encountered defective sector is processed as before. If the PDL entry type is $01b$, which is a case when only the first sectors of defective blocks listed on the SDL are listed on the PDL, sectors starting from the defective sector, taken as a first sector, and up to 15 sector thereafter, (i.e., sectors for one block inclusive of the defective sector) are subjected to slipping replacement.

Referring to FIG. 10 or 11, if one of the defective blocks listed on the SDL is encountered during writing (or reading), as shown in FIG. 4B, the defective block is subjected to linear replacement. If the data is realtime data, other methods may be employed.

Thus, the second embodiment of the present invention facilitates a more effective management of the DMA list by converting only first sectors or all 16 sectors of defective blocks listed on the SDL into the PDL at a user's option, and by indicating the users selection on the PDL entry in reformatting.

As has been explained, the method for formatting and managing defective areas of a rewritable optical recording medium of the present invention has an advantage of improving system performance in reformatting when the SDL is converted into the PDL without certification by converting sector numbers of first sectors of the defective blocks listed on the SDL into the PDL. If the defective sector is encountered during writing/reading thereafter, 16 sectors inclusive of the defective sector are subjected to slipping replacement.

It will be apparent to those skilled in the art that various modifications and variations can be made in the method for formatting, and managing defective area of, a rewritable optical recording medium of the present invention without departing from the spirit or scope of the invention. Thus, it is intended that the present invention cover the modifications and variations of this invention provided they come within the scope of the appended claims and their equivalents.

What is claimed is:

1. A method for formatting an optical recording medium, comprising:

transferring information on defects listed on a secondary defect list (SDL) to a primary defect list (PDL); and listing only information on first sectors of defective blocks from the SDL on the PDL.

2. A method as in claim 1, wherein the listing step includes:

listing only sector numbers of the first sectors of the defective blocks from the SDL on the PDL without a certification process.

3. A method for managing a defective area of an optical recording medium, the optical recording medium carrying data for defective areas listed on first, second and third lists of a primary defect list (PDL), the method comprising:

subjecting defective sectors to slipping replacement when the defective sectors are listed on at least one of the first and second lists of the PDL; and subjecting blocks of data containing defective sectors to slipping replacement when first sectors of said blocks are listed as defective sectors on the third list of the PDL.

4. A method as in claim 3, further comprising:

subjecting additional sectors listed on the PDL to slipping replacement if the block containing the defective sector includes the additional sectors.

5. A method as in claim 3, wherein the step of subjecting includes:

not assigning logical sector numbers to sectors of blocks containing the defective sectors.

6. A method as in claim 3, wherein the first, second and third lists correspond to a P-list, a $G_1$-list, and a $G_2$-list of the PDL, respectively.

7. A method for formatting an optical recording medium, comprising:

transferring information on defects from a secondary defect list (SDL) to a primary defect list (PDL) in either block or sector units based on a predetermined indication; and listing the information in block units or sector units on the PDL based on the indication.

8. A method as in claim 7, wherein the listing step includes:

listing only information on first sectors of defective blocks when information on defects is to be listed in block units.

9. A method as in claim 7, wherein the listing step includes:

listing information on all sectors of defective blocks respectively when information on defects is to be listed in sector units.

10. A method as in claim 7, wherein the listing step includes:

listing information on all sectors of defective blocks listed on the SDL on the PDL without certification when information on defects is to be listed in block units.

11. A method as in claim 7, further comprising:

expressing the indication by a flag assigned to a reserved area of the PDL.

12. A method as in claim 7, further comprising:

expressing the indication by an entry type of the PDL.

13. A method for managing a defective area of an optical recording medium, in which data is written with an encountered defective area being subjected to slipping replacement, the method comprising:

determining whether an encountered defective sector listed on a primary defect list (PDL) is listed in block units or sector units by using indication information; and, subjecting a block containing the defective sector to slipping replacement if the encountered defective sector is a defective sector listed in block units.

14. A method as in claim 13, further comprising:

subjecting additional sectors listed on the PDL to slipping replacement if the block containing the defective sector includes the additional sectors.

15. A method as in claim 13, wherein the step of subjecting includes:
not assigning logical sector numbers to sectors of the block containing the defective sector.

16. A method as in claim 13, further comprising:
slipping-replacing only the encountered defective sector if the defective sector is listed in sector units on the PDL.

17. A method as in claim 13, wherein the indication information is expressed by a flag assigned to a reserved area of the PDL.

18. A method as in claim 13, wherein the indication information is expressed by an entry type of the PDL.

19. A method for formatting an optical recording medium, comprising:
transferring information on defects listed on a second defect list to a first defect list; and
listing information of first sectors of defective blocks from the second defect list onto the first defect list.

20. A method as in claim 19, wherein the listing step includes:
listing only sector numbers of the first sectors of the defective blocks from the first and second defect lists without a certification process.

21. A method as in claim 19, wherein the first and second defect lists are an SDL (secondary defect list) and a PDL (primary defect list), respectively.

22. A method as in claim 19, further comprising:
subjecting blocks of data containing defective sectors to slipping replacement when first sectors of said blocks are listed as defective sectors on the first defect list.

23. A method as in claim 19, further comprising:
determining whether an encountered defective sector listed on the first defect list is listed in block units or sector units by using indication information; and
subjecting a block containing the defective sector to slipping replacement if the encountered defective sector is a defective sector listed in block units.

* * * * *